United States Patent [19]

Douglas

[11] 4,049,572

[45] Sept. 20, 1977

[54] CATALYST AND METHOD OF MANUFACTURE AND USE THEREOF

[75] Inventor: Walter M. Douglas, Streamwood, Ill.

[73] Assignee: UOP Inc., Des Plaines, Ill.

[21] Appl. No.: 660,899

[22] Filed: Feb. 24, 1976

[51] Int. Cl.$^2$ .................... B01J 31/12; C09B 47/04
[52] U.S. Cl. .................... 252/431 N; 260/314.5
[58] Field of Search .................... 252/431 N; 260/314.5

[56] References Cited

U.S. PATENT DOCUMENTS

| | | | |
|---|---|---|---|
| 2,242,469 | 5/1941 | Hoyer et al. | 260/314.5 |
| 2,673,854 | 3/1954 | Brouillard | 260/314.5 |
| 3,108,081 | 10/1963 | Gleim et al. | 252/431 N X |
| 3,230,180 | 1/1966 | Larson | 252/431 N |
| 3,393,200 | 7/1968 | Bachmann et al. | 260/314.5 |
| 3,471,254 | 10/1969 | Urban | 252/431 N X |
| 3,519,641 | 7/1970 | Nitzschmann et al. | 260/314.5 |
| 3,565,959 | 2/1971 | Takase et al. | 252/431 N X |
| 3,775,423 | 11/1973 | Lamure | 260/314.5 X |
| 3,963,743 | 6/1976 | Stepp | 260/314.5 |

*Primary Examiner*—Patrick P. Garvin
*Assistant Examiner*—William G. Wright
*Attorney, Agent, or Firm*—James R. Hoatson, Jr.; Richard D. Stone; William H. Page, II

[57] ABSTRACT

A catalyst comprising a metal phthalocyanine composition of matter is prepared by reacting a 4-sulfophthalic acid with a metal salt, an ammonium donor and a phthalic anhydride or derivative thereof at 250 to 325 C for one-half to ten hours.

13 Claims, No Drawings

CATALYST AND METHOD OF MANUFACTURE AND USE THEREOF

The invention relates to a new catalyst, its method of preparation and use.

The catalyst is characterized by its method of preparation, i.e., reaction of a 4-sulfophthalic acid, an ammonium donor, a metal salt, a phthalic anhydride or one of its derivatives and an optional promoter in water at a temperature of 250 to 325 C for one-half to ten hours.

When the metal salt used is a cobalt salt, it is possible to make a cobalt phthalocyanine sulfonate with unique properties. This catalyst is a powerful oxidizing catalyst, especially suited for catalyzing oxidation of mercaptan sulfur to disulfides.

Many hydrocarbons contain mercaptan sulfur. Mercaptan contamination of hydrocarbons is a prevailing problem in industry. Mercaptans are frequently present in natural gases, such as methane and ethane. They are almost invariably present in cracked gasolines, straight gasolines, natural gasolines, and heavier hydrocarbon distillates including, e.g., kerosene and fuel oil.

These mercaptan components are objectionable because of their strong odor. These mercaptans also are corrosive.

There have been many attempts to provide processes which would remove or convert mercaptans. Some of the earliest processes included treatment of the hydrocarbon fraction with caustic, clays, and hydrotreating. A significant improvement in the treating of hydrocarbon fractions was made when the UOP Merox Process was announced to the industry in 1959. The Oil & Gas J. 57(44), 73–8 (1959), contains a discussion of the Merox Process and also of some prior art processes. The Merox Process uses a catalyst which is soluble in caustic, or alternatively is held on a support, to oxidize mercaptans to disulfides in the presence of oxygen and caustic.

In U.S. Pat. No. 3,108,081, there is disclosed a catalyst comprising an adsorptive carrier and a phthalocyanine catalyst for the oxidation of mercaptans. The teachings of this patent are incorporated by reference. This patent taught that a particularly preferred phthalocyanine was the sulfonated derivative, with the monosulfonate being especially preferred.

Metal phthalocyanine monosulfonates are well known compounds and are easily prepared. The most common method used to prepare these is by reaction of the corresponding metal phthalocyanine with oleum or sulfuric acid. Unfortunately, the reaction in oleum is somewhat hard to control in that a very large proportion of the phthalocyanine consists of di- and tri-sulfonated derivatives. The di- and tri-sulfonated derivatives of the metal phthalocyanines, especially of cobalt phthalocyanine, are much more soluble in hydrocarbon and in caustic than the monosulfonate. This solubility characteristic is of critical importance when this catalyst is used for the fixed bed treating of sour hydrocarbons to sweeten them. This is because the catalyst must have some solubility to permit its incorporation onto a solid carrier. However, the catalyst once placed on the carrier must remain attached so that catalytic activity will be maintained. From an economic viewpoint, it is desirable that the catalyst easily be placed on the support from the impregnating solution and not require extensive recycling to support all the catalyst. Accordingly, refiners and researchers in petroleum technology have made extensive studies of catalyst which can be used on fixed bed systems.

As applied to the fixed bed sweetening of hydrocarbons, use of the cobalt phthalocyanine monosulfonate was preferred. The unsulfonated cobalt phthalocyanine was not soluble, and attempts to prepare a fixed bed of cobalt phthalocyanine catalyst were unsuccessful.

Though it is easy to dissolve the more highly sulfonated materials in the impregnating solution, their very solubility makes it more difficult to place all the catalyst on the support. It can be accomplished if repeated recycling of the impregnating solutions is performed, but this is undesirable from an economic viewpoint. Furthermore, the more highly sulfonated species are susceptible to leaching from the catalyst support when caustic solutions — an integral part of sweetening process — are applied. This leaching means the loss of catalyst from the support.

The monosulfonate was thus considered the best form of the phthalocyanine catalyst for use in fixed bed sweetening. Although it was relatively difficult to dissolve, and required a fairly elaborate impregnation procedure, once attached to the support it was generally held tenaciously by the support. It was only with careful control of reaction conditions that a reasonably pure monosulfonate could be obtained via the oleum preparation method. Despite careful juggling of amounts of reagents used, a significant amount of the more highly sulfonated derivatives was formed, and these derivatives presented the difficulties mentioned above. The loss of catalyst to the aqueous alkaline solutions encountered in sweetening operations could be tolerated if the multi-sulfonated derivatives of the metal phthalocyanines were kept to a minimum.

Another problem with the monosulfonate prepared by reacting a metal phthalocyanine in oleum was the waste disposal problem, i.e., getting rid of the spent sulfuric acid and reagents which did not form catalyst. There was also a significant expense involved in isolating the active catalyst, i.e., the metal phthalocyanine monosulfonate, from the reaction mass.

To put in proper perspective the magnitude of the problem facing petroleum technologists, it is worthy of note that most of the refineries in the world have a UOP Merox unit in one form or another. It is estimated that over 5 million barrels per day of hydrocarbons pass through Merox units ranging in capacity from 40 to 120,000 barrels per day. Because of the worldwide interest which was shown in this process, there have been continuing attempts to improved upon it.

I studied the work that prior researchers had done, and in attempting to develop better and cheaper ways of making the catalyst, unexpectedly came upon a new catalyst. The catalyst is difficult to characterize, but appears to differ from conventional phthalocyanine catalysts, in addition to being produced by a simpler and cleaner procedure.

Accordingly the present invention provides a catalyst comprising a metal phthalocyanine composition of matter prepared by the method which comprises reacting a 4-sulfophthalic acid compound with a metal salt, an ammonium donor, and a compound selected from the group of benzene-1,2-dicarboxylic acid and derivatives thereof, in aqueous solution by heating to 250° to 325° C for one-half to 10 hours.

In another embodiment, the present invention provides a method of manufacturing a catalyst which comprises reacting a 4-sulfophthalic acid compound with a metal salt, an ammonium donor, and a compound selected from the group of benzene-1,2-dicarboxylic acid and derivatives thereof, in aqueous solution by heating to 250° to 325° C for one-half to 10 hours.

In yet another embodiment, the present invention provides in a process for oxidizing a mercaptan with oxygen in the presence of a catalyst, the improvement comprising, use of the catalyst of Claim 1.

The catalyst of the present invention is especially useful for sweetening of sour hydrocarbon fractions. The catalyst may also be used for electrochemical reactions, biochemical reactions, hydroformylation, and many other reactions wherein catalysts are used.

The material prepared by the method of the present invention also may be useful as a dye. A cobalt composition of matter prepared by the method of the present invention has a blue-black appearance, as do alcoholic solutions thereof, while a compound prepared by the oleum route has a purple cast.

The novel catalyst of the present invention is characterized by its method of preparation. The essential ingredients are a metal salt, an ammonium donor, a 4-sulfophthalic acid, and a 1,2-dicarboxylic acid or derivative thereof. Typical of the 1,2-dicarboxylic acids are benzene-1,2-dicarboxylic acid or a derivative or said acid such as benzene-1,2-dicarboxylic acid anhydride (also known as phthalic anhydride), benzene-1,2-dicarboxylic acid di-amide (phthalic diamide) and other such derivatives commonly known as phthalamic acid, dicyanobenzene, etc. It is preferred to include a promoter, which seems to act as a catalyst to promote the desired reactions. The promoter may be compounds such as boric acids, ammonium chromate, chromic oxide, selenic acid, ammonium chloride, ferric chloride, potassium vanadate, vanadic acid, lead monoxide or dioxide, zinc oxide, arsenous or arsenic oxide, antomony oxide, molybdic oxide, phosphomolybdic acid, molybdic oxide, ammonium molybdate and similar compounds.

The 4-sulfophthalic acid compound may be either the acid or an acid salt, e.g., triammonium 4-sulfophthalate. If the salt is used, it may possess a cation of e.g., lithium, potassium, rubidium, cesium, barium, strontium, calcium, magnesium, beryllium, titanium, scandium, zirconium, manganese, rhenium, etc.

The metal salt which is dissolved in an aqueous medium for reaction with the reactants may be any metal salt from Groups IV-B, V-B, VI-B or preferably Group VIII of the Periodic Table, e.g., cobalt sulfate, cobaltous bromide, nickel nitrate. Thus, in general, any metal salts such as the sulfate, nitrate or chloride, etc., of a Group VIII metal, or of a metal of Groups IV-B, V-B, VI-B, may be used. It is also possible to start with a metal which forms a metal salt, in situ, during the course of the reaction. For instance cobalt or copper dust may be used in place of the metals salt.

The ammonium donor compound can be anything which will decompose to give ammonia or react with the phthalates to form amides, imides, etc. These compounds are well known in the art and include urea, alum, ammonium borate, biuret, hydrazine, guanidine and similar compounds.

Any derivatives of benzene-1,2-dicarboxylic acid such as phthalic acid itself, phthalimide, phthalonitrile, or phthalic anhydride, may be used as one of the essential starting materials. Phthalic anhydride is preferred.

The amount of the various reactants required may be determined by calculating the stoichiometric amount necessary to produce the phthalocyanine monosulfonate. Especially in the presence of a promoter, the reaction proceeds rapidly with minimal production of by-products or undesirable side reactions. Accordingly, none of the reactants need to be present in any great excess. Water is also a necessary part of the reaction mixture, because during the early stages of the reaction, it insures proper mixing of the first reaction mixture. The preferred amount of water required to permit the reaction to properly proceed is 10 wt. percent, or more, based on the other dry ingredients. Optimum results seem to be obtained with 15 to 25 wt. percent water, again based on dry ingredients. Inclusion of more water than this is not harmful, because the excess water eventually evaporates at the high temperatures used, however, there is not particular advantage gained by using excess amounts of water.

The reaction pressure is not critical. The reaction may be carried out at any pressure from sub-atmospheric to super-atmospheric though it is generally most economical to carry out the process at atmospheric pressure.

In a specific embodiment the first reaction mass, consisting of a 4-sulfophthalic acid, a phthalic anhydride, a metal salt, urea, and a promoter, is heated in a di-partite or tri-partite manner or at a single high temperature of between 250° and 325° C. In a tri-partite heating manner, the first reaction temperature is 165 to 210° C, the second reaction temperature is 200° to 250° C and the third reaction temperature is 250° to 325° C. Typically, if heated less than 185° C the percentage of the desired component will be about 25%. If an initial temperature of less than 165° C is used, the poor yields make the process uneconomic. If a single reaction temperature is utilized, it has been found that the desirable component of the catalytic composition of matter is optimized by heating at a temperature between 250° and 325° C for a period of ½–10 hrs.

Although it is not completely understood, it is believed that, when using a tri-partite heating cycle, during the first reaction temperature cycle the 4-sulfophthalic acid, phthalic anhydride, and urea react with each other to produce an intermediate of the proper composition and configuration for final condensation into the product which possesses the internal ring structure characteristic of phthalocyanine compounds. My work has shown that if the first reaction temperatures are lower than those specified in this invention are used, the amount of the desired component in the final catalytic product is decreased by 50%. A typical catalyst will have more than one component of which one —the monosulfonated component—is the most desired for fixed bed sweetening. If the first reaction temperature is in accord with this invention, it is found that the final product can contain over 50% of the desired component, the remainder being more highly sulfonated species. If the first reaction temperature is less than that specified in this invention, the desired component can drop to less than 25% of the product with a corresponding increase in the sum of more highly sulfonated components. This is undesirable because the more highly sulfonated components are those components which are susceptible to removal from the support upon which this catalyst is used. It is felt that the reason why the higher reaction temperature enriches the final product in the desired component is that the relative reactivity of the 4-sulfophthalic acid and phthalic anhydride become more nearly equal. At lower temperatures, 4-sulfophthalic acid is more reactive than phthalic anhydride and preferentially forms with itself the intermediate susceptible to final condensation into the phthalocyanine structure. The result of such preferential first reaction is enrichment of the product in the more highly sulfonated components.

During the time at the second reaction temperature, the intermediate formed during the first period is condensed by ring formation and closure into a product possessing the characteristic phthalocyanine structure. It is believed that the promoter such as ammonium molybdate facilitates this formation and closure by co-ordination to the intermediate. This coordination brings the parts of the intermediate into the proper spacial arrangement for final formation of the product. At some point during this proces, the metal atom, such as cobalt, nickel, vanadium, etc., which will be contained in the final product is placed in the center of the phthalocyanine ring to give the final product.

If a single heating temperature of between 250° and 325° C is used, the processes which occur in the bi- and tri-partite heating methods are accelerated and, with due allowance for requiring the initial reaction mass to be dehydrated of its water and raised in temperature, may be envisioned as occurring simultaneously.

Based on experimental analysis, the nominally designated cobalt phthalocyanine monosulfonate prepared by the method of the present invention, though containing predominantly the monosulfonate, was also found to contain some of the more highy sulfonated materials such as the disulfonate, trisulfonate, and tetrasulfonate. In contradistinction to practical experience in actually using catalysts prepared by sulfonation of cobalt phthalocyanine in oleum (prior art), the presence of these more highly sulfonated components in the catalytic reaction mass produced by this invention did not lead to loss of catalyst from the supporting bed as evidenced by the color of the fluids leaving the reaction zone. This difference is first observed when the support is impregnated with an alcoholic dispersion of the catalyst. The deeply blue catalyst solution is poured over the top of the bed and the effluent alcohol coming out of the bed is colorless, thereby indicating that the catalyst has been fully deposited on the supporting bed. Further, when a caustic solution is applied to the bed, no color is observed in the effluent coming out of the bed. As a result of these distinctions, it is felt that a catalyst prepared by the method of this invention and a catalyst prepared by the method of the prior art, are not identical. Highly sulfonated phthalocyanines prepared by the prior art are often washed off the support material when a caustic is applied and can only be redeposited on the support by repeated recycling of the caustic. The catalyst prepared by the method of the present invention easily goes onto the support and is not readily washed off the support when a caustic solution is applied. If some material does happen to come off the support, it can be redeposited thereon by a single recycling of the caustic and will not subsequently wash off the support.

Further support for the two materials being different comes from a report in J. Chemical Society (1950)2975. In that article, Linstead and Weiss reported that copper tetra-4-sulfophthalocyanine, prepared from 4-sulfophthalic acid, is redder than the product prepared by the direct sulfonation of copper phthalocyanine. They believed that the greenness of the directly sulfonated product is attributable to the presence of one or more sulfonic acid groups in the 3-position. In using 4-sulfophthalic acid, the sulfonic acid groups are restricted to the 4-position in the final product.

By analogy to the above cited work, it is felt that the product of this invention, prepared by reaction with 4-sulfophthalic acid, will likewise restrict the sulfonic acid group to the 4-position in the final product, whereas direct sulfonation of cobalt phthalocyanine will lead to a material containing some or all of the sulfonic acid group in the 3-position. This explanation helps to understand why the cataylst of the present invention, when viewed as a solid, has a dark blue-black appearance whereas catalyst prepared by oleum or sulfuric acid sulfonation has a strong purple cast.

The exact difference between the catalyst of the present invention and that of the prior art is not fully understood at this time.

The catalyst of the present invention may be, and preferably is, incorporated onto a solid support. The solid support may be any porous, high surface area material such as fuller's earth, bentonite, charcoal, alumina, mordenite, faujasite, or any other well-known catalyst carrier materials, though all supports do not give equivalent results and cannot always be impregnated in the same fashion. Especially preferred are the charcoals available commercially which are derived from vegetable sources, e.g., Nuchar, sold by Westvaco and Norit, sold by the Norit Co.

The catalyst may be incorporated into the carrier material by any methods known in the art. An excellent way to prepare the carrier material is to dissolve the metal phthalocyanine monosulfonate in an alcoholic solution and pass the solution over a fixed bed of carrier material. The catalyst may comprise from .001 to 10 weight percent of the carrier material. It is preferable that a relatively dilute impregnating solution be used, because if a very concentrated impregnating solution is used there is a tendency to have most of the catalyst deposited on the point in the catalyst bed nearest the impregnating fluid inlet. Impregnation may occur in upflow, downflow, or radial flow. Alternatively, impregnation may be accomplished in batch operation wherein the catalyst, carrier, and alcohol or other catalyst dispersion medium are contacted by mixing in a vessel.

When applied to the sweetening of hydrocarbons, the reaction conditions and methods disclosed in previously mentioned U.S. Pat. No. 3,108,081 may be used. This patent relates to a fixed bed sweetening process.

In an alternative sweetening process, the catalyst of the present invention may be used, dissolved in caustic, though not necessarily with equivalent results. It is not understood why the catalyst of the present invention is so tenaceously held by charcoal; however, it is believed that in the absence of a charcoal or other carrier, and in the presence of caustic, that the presence of the more highly sulfonated derivatives, of the metal phthalocyanine will lead to good results when used as an oxidation catalyst for liquid-liquid sweetening. Details of the liquid-liquid sweetening process are given in U.S. Pat. No. 2,882,224 (Class 208-206) the teachings of which are incorporated by reference. The catalyst of the present invention should work in, but is not preferred for liquid-liquid sweetening, because its slightly decreased solubility makes use of other sulfonated derivatives more attractive, as they are more soluble.

EXAMPLE

Several catalyst samples were prepared by the method of the present invention and by prior art methods. For comparison purposes a commerically available catalyst, which is believed made by the oleum route and a material prepared by the sulfonation of cobalt phthalocyanine in sulfuric acid according to the teaching of U.S. Pat. No. 3,091,618 are also included.

In order to compare the catalyst of the present invention with that of the prior art, cobalt phthalocyanine was sulfonated in sulfuric acid under an atmosphere of carbon dioxide in a manner similar to that described in U.S. Pat. No. 3,091,618. In this experiment 52 parts of cobalt phthalocyanine was added to 720 parts of 100% sufuric acid over a period of 1.5 hours. The mixutre was then stirred at room temperature for 16 hours, to insure that the cobalt phthalocyanine had completely dissolved. The reaction mixture was heated to a temperature of 120±1 C over a period of 2.5-3.0 hours and then maintained at that temperature for a period of 6.0 hours. The reaction was considered complete when, according to U.S. Pat. No. 3,091,618, "...2 drops of the sulfonation when boiled for 30 seconds in 10 cc of 10% sodium carbonate became completely soluble on the addition of 2 cc of pyridine. This required 6 hours of heating at 120° C." The product of the sulfonation was isolated according to teachings of U.S. Pat. No. 3,091,618.

In a typical preparation of a catalyst of the present invention, 15 parts by weight of a 50 wt. % solution of 4-sulfophthalic acid, 9.3 parts of $CoSO_4.7H_2O$, 0.1 parts of ammonium molybdate and 15 parts of water were mixed together by stirring until all the solids had dissolved. To this solution 40 parts or urea were added and the mixture was stirred until most of the urea had dissolved. This reaction mixture was poured into a reactor to which 14 parts of phthalic anhydride had previously been added. The complete reaction mixture was then placed into a heating vessel which was preheated to 210° C. The temperature was maintained between 190°-215° C. for a period of 3 hours. The temperature was then raised to 260°-270° C. and maintained for an additional 3.5 hours. After cooling and grinding the reaction product, the material was found by chromatograph to contain 54% of the monosulfonated material (Catalyst O, Table II).

The various catalysts were analyzed by a chromatographic separation process to distinguish between the various catalysts produced. The chromatographic separation shows differences between catalyst of the present invention and catalyst of the prior art, however, not all of the catalyst species which are separated are identifiable. Some of the catalyst components are merely listed as Unknowns A and B, some are listed as two forms of a monosulfonate, $M_1$ and $M_2$, but it is impossible to draw a picture showing the differences between $M_1$ and $M_2$. Similarly, the chromatographic process used shows the there are two forms of the disulfonate derivatives, but the exact configuration of the $D_1$ and $D_2$ derivates is not known. No separation of trisulfonated phthalocyanines occurred, but with highly sulfonated derivatives such as these there very well may be varying isomeric distributions. The percentage of tetrasulfonated derivatives and non-sulfonated derivatives are lumped together, though the tetrasulfonate derivatives are believed to comprise the majority of this material.

The reaction conditions used to prepare each catalyst are also listed, along with the weight ratios of reactants used. Also, reported are tests on some of the more promising catalysts for activity for converting mercaptan sulfur to disulfides. The test procedure used was basically that outlined in the solid bed sweetening process of U.S. Pat. No. 3,108,081. The catalysts were tested for their ability to sweeten a kerosene charge stock which from prior experience was known to be difficult to sweeten. These experimental tests are only intended for comparison purposes. The test procedure used on all catalysts was uniform, i.e., same charcoal support, same reaction conditions during the mercaptan oxidation test runs, and same feedstock. Thus, they are believed valid indicators of the relative performances of these catalysts at one particular set of test conditions.

The test results reported are weight ppm mercaptan sulfur remaining in the charge stock after twenty hours of operation through a fixed bed unit. The test results during intermediate hours of operation are also reported for a number of the catalysts which gave the most interesting results. From the test results it appears that the catalysts prepared by the oleum preparation method, and even some of the catalysts of the present invention, actually increase in activity for a few hours and then slowly decline in activity. Some of the catalysts of the present invention exhibited contrary behavior, namely highest activity at the start with a constant decline in activity. High initial activity followed by a gradual decline in activity may be considered the expected result in testing a catalyst, however, it is contrary to experimental results obtained with prior art catalysts. The test method used is, of course, an accelerated test and does not correspond to commercial operation, i.e., commercially, fixed bed sweetening unit usually operate for several weeks or months before regeneration is required.

The results are reported under three tables. Table I shows the effect of changing the concentration of phthalic anhydride on the product, while holding the time and temperature of reaction generally constant. Table II permits some variation in reactants used, but primarily investigates the effect of different temperatures used during catalyst preparation. Table III reports the data obtained at intermediate time intervals in the mercaptan conversion test. All of the catalysts tested in Table III were also included in Table II, however, more extensive data are presented.

TABLE I

| | EFFECT OF PHTHALIC ANHYDRIDE ON PRODUCT | | | | | | | |
|---|---|---|---|---|---|---|---|---|
| CATALYST | A | B | C | D | E | F | G | H |
| Chromatographic Analysis of Catalyst: | | | | | | | | |
| Unknown | 3.9 | 4.4 | 6.1 | 4.9 | 3.7 | 5.4 | 9.5 | 4.6 |
| Unknown A | 6.0 | 7.0 | 9.4 | 8.6 | 9.3 | 9.2 | 10.5 | — |
| Unknown B | 5.3 | 5.7 | 7.0 | 6.1 | 4.7 | 5.4 | 6.5 | — |
| $M_2$* | 13.8 | 11.0 | 15.5 | 13.5 | 18.2 | 16.8 | 18.0 | 12.7 |
| $M_1$* | 9.6 | 15.0 | 9.4 | 12.3 | 6.6 | 11.4 | 11.0 | 10.9 |
| $D_2$** | 15.2 | 22.0 | 14.1 | 14.7 | 16.4 | 20.5 | 18.5 | 10.8 |
| $D_1$** | 17.4 | 11.0 | 15.0 | 17.2 | 15.0 | 5.9 | 7.0 | 10.0 |
| Tri*** | 15.6 | 14.1 | 12.2 | 9.8 | 12.1 | 11.4 | 7.5 | 21.8 |
| Tetra = Non**** | 13.1 | 9.8 | 11.3 | 12.9 | 14.0 | 14.0 | 11.5 | 29.1 |

TABLE I-continued

| | EFFECT OF PHTHALIC ANHYDRIDE ON PRODUCT | | | | | | | |
|---|---|---|---|---|---|---|---|---|
| CATALYST | A | B | C | D | E | F | G | H |
| Total Monosulfonate | 23.4 | 26.0 | 24.9 | 25.8 | 24.8 | 28.2 | 29.0 | 23.6 |
| Catalyst Preparation Reaction Conditions: | | | | | | | | |
| * C/hours | 135/1 | 135/2 | 135/1 | 135/2 | 135/1 | 135/1 | 135/1 | 170/2 |
| * C/hours | 165/2 | 165/2 | 165/2 | 165/2 | 165/2 | 165/2 | 165/2 | 225/2 |
| * C/hours | 210/2 | 210/1 | 210/1 | 210/1 | 210/1 | 210/1 | 210/1 | 266/2 |
| * C/hours | 260/2 | 260/2 | 260/2 | 260/2 | 260/2 | 260/2 | 260/2 | — |
| Weights Of: | | | | | | | | |
| 4-Sulfophthalic Acid | 1.0 | 1.0 | 1.0 | 1.0 | 1.0 | 1.0 | 1.0 | 1.0 |
| Phthalic-Anhydride | 2.0 | 2.3 | 2.5 | 3.0 | 3.5 | 4.0 | 3.0 | 2.5 |
| Catalyst Activity (20 Hour Test): | | | | | | | | |
| ppm RSH | | 28 | — | — | — | — | — | — |

*Monosulfonate
**Di-sulfonate
***Tri-sulfonate
****Tetra-sulfonate

TABLE II

| CATALYST | I | J | K | L | M | N | O |
|---|---|---|---|---|---|---|---|
| Chromatographic Analysis Of Catalyst: | | | | | | | |
| Unknown | 3.1 | — | — | — | 2.0 | — | — |
| Unknown A | 10 | — | — | — | — | — | — |
| Unknown B | 10 | — | — | — | — | — | — |
| $M_2$ | 3.1 | 25.6 | 19.2 | 19.5 | 27 | 20 | 21 |
| $M_1$ | 23.1 | 25.9 | 28.6 | 24.9 | 27 | 26 | 21 |
| $D_2$ | 8.1 | 8.1 | 13.2 | 11.9 | 12 | 12 | 10 |
| $D_1$ | 11.3 | 10 | 17 | 17.2 | 14 | 16 | 22 |
| Tri | 12.5 | 7.5 | 10.5 | 13.5 | 10 | 12 | 11 |
| Tetra + Non | 28.8 | 21.9 | 11.5 | 13.0 | 8 | 14 | 15 |
| Total Monosulfonate | 26.2 | 51.5 | 47.8 | 44.4 | 54 | 46 | 42 |
| Catalyst Preparation Reaction Conditions: | | | | | | | |
| * C/hours | 215/2.5 | 215/2.5 | 165/2.5 | 165/2.5 | 215/3 | 215/3 | 115–210/3 |
| * C/hours | 265/3.75 | 265/3.75 | 215/2.0 | 215/2.0 | 265/3.5 | 265/3.5 | 265/3 |
| * C/hours | | | 265/2.5 | 265/2.5 | | | |
| Weights Of: | | | | | | | |
| 4-Sulfophthalic Acid | 1.0 | 1.0 | *1.0 | *1.0 | 1.0 | 1.0 | 1.0 |
| Phthalic-Anhydride | 2.5 | 3.0 | 3.0 | 2.5 | 3.0 | 3.2 | 3.0 |
| Catalyst Activity (20 Hour Test): | | | | | | | |
| ppm RSH | — | 36 | 34 | 24 | 28 | 26 | 28 |

| CATALYST | P | Q | R | S | T | U** | V |
|---|---|---|---|---|---|---|---|
| Chromatographic Analysis Of Catalyst: | | | | | | | |
| Unknown | — | — | 1.0 | 1.0 | 0 | — | 3.0 |
| Unknown A | — | — | — | — | — | — | — |
| Unknown B | — | — | — | — | — | — | — |
| $M_2$ | 22 | 23 | 24 | 15 | 25 | 47 | 50 |
| $M_1$ | 25 | 25 | 22 | 30 | 32 | 18 | 18 |
| $D_2$ | 11 | 12 | 14 | 18 | 19 | 18 | 13 |
| $D_1$ | 17 | 18 | 17 | 19 | 15 | 5 | 7 |
| Tri | 11 | 12 | 11 | 4 | 4 | 8 | 3 |
| Tetra + Non | 14 | 10 | 11 | 13 | 5 | 2 | 6 |
| Total Monosulfonate | 47 | 48 | 46 | 45 | 57 | 65 | 68 |
| Catalyst Preparation Reaction Conditions: | | | | | | | |
| * C/hours | 115–210/3 | 190/3 | 190/3 | 265/5 | 265/5 | NA | Sulfuric Acid According |
| * C/hours | 265/3 | 210/1 | 210/1 | | | NA | to U.S. Pat. No. |
| * C/hours | | 260/3 | 260/3 | | | NA | 3,091,618 |
| Weights Of: | | | | | | | |
| 4-Sulfophthalic Acid | 1.0 | 1.0 | 1.0 | 1.0 | 1.0 | NA | |
| Phthalic-Anhydride | 3.2 | 3.0 | 3.2 | 3.0 | 3.5 | NA | |
| Catalyst Activity (20 Hour Test): | | | | | | | |
| ppm RSH | 24 | 24 | 26 | 22 | 22 | 24 | 19 |

*disodium 4-sulfophthalate used instead of 4-sulfophthalic acid.
**A sample of a commercially available monosulfonate, believed to be made via reaction with oleum.

TABLE III*

| CATALYST | M | N | O | P | Q | R | S | T | U | V |
|---|---|---|---|---|---|---|---|---|---|---|
| Hr 2 | 19 | 18 | 17 | 24 | 24 | 18 | 15 | 11 | 24 | 13 |
| Hr 7 | 20 | 18 | 17 | 17 | 19 | 18 | 14 | 13 | 18 | 11 |
| Hr 12 | 22 | 20 | 20 | 19 | 21 | 21 | 17 | 16 | 18 | 13 |
| Hr 16 | 26 | 24 | 24 | 22 | 23 | — | 20 | 19 | 21 | 16 |
| Hr 20 | 28 | 26 | 28 | 24 | 24 | 26 | 22 | 22 | 24 | 19 |

*All results ± 4

From an inspection of the above data, it is evident that the catalyst of the present invention provides excellent activity for the conversion of mercaptans. Especially preferred are catalysts prepared using a single high temperature reaction step, e.g., catalysts S and T. These catalysts had very high activities, and would be fairly easy to make commercially because of the simplicity of the reaction conditions. Catalysts S and T had higher activity than did Catalyst U, a commerically available mono-sulfonate. It is believed that Catalyst U was made by approximately the same procedure as Catalyst V, reaction with $H_2SO_4$ or oleum, and this belief is further substantiated by an examination of the isomer distribution of these catalysts. The ratio of $M_2$ and $M_1$ is almost identical in each of the oleum route preps, about 2.7 to 1. In contrast the catalyst of the present invention had a significantly different ratio, approximately 0.5:1 for Catalyst S, and 0.8 to 1 for Catalyst T. These ratios refer to different monosulfonte isomers, as previously mentioned $M_1$ and $M_2$ are both isomers of mono-sulfonates. Thus it is believed that catalysts of the present invention are different materials than catalysts prepared by prior art methods. In addition to being a different material, the catalyst of the present invention is prepared by a much simpler method, without the danger both to personnel and the environment, of using a sulfuric acid or oleum route to prepare sulfonated derivatives.

I claim as my invention:

1. A method of manufacturing a catalyst which comprises reacting a 4-sulfophthalic acid compound with a metal salt, an ammonium donor, and a compound selected from the group of benzene-1,2-dicarboxylic acid and derivatives thereof, in aqueous solution by heating to 250° to 325° C for one-half to 10 hours.

2. The method of claim 1 wherein the solution is heated at 250° to 300° for one to six hours.

3. The method of claim 1 wheren the solution is heated at 165° to 275° C for one to four hours and then heated to 250° to 325° C for one to four hours.

4. The method of claim 1 wherein the solution is heated at 165° to 210° C for one to four hours, 200° to 250° C for one to four hours, and 250° to 325° C for one to four hours.

5. The method of claim 1 wherein the reaction is conducted at a pressure sufficient to maintain liquid phase.

6. The method of claim 1 wherein the metal salt is selected from the group of cobalt metal salt, a vanadyl metal salt, a rhodium metal salt, and a manganese metal salt.

7. The method of claim 1 wherein the ammonium donor is selected from the group consisting of urea, alum, hydrazine, biuret, and guanidine.

8. The method of claim 1 wherein the reaction conditions includes the presence of a promoter.

9. The method of claim 1 wherein the benzene-1,2-dicarboxylic acid or its derivative is selected from the group of phthalic anhydride, phthalic acid, phthalimide, and o-dicyanobenzene and phthalamic acid.

10. The method of claim 1 wherein the 4-sulfophthalic acid compound is selected from the group of 4-sulfophthalic acid, and salts of said acid.

11. The method of claim 1 wherein the 4-sulfophthalic acid compound is an acid salt of said acid and contains a cation selected from the group of lithium, potassium, rubidium, cesium, barium, strontium, calcium, magnesium, beryllium, titanium, scandium, zirconium, manganese and rhenium.

12. The method of claim 1 wherein 4-sulfophthalic acid and phthalic anhdyride are reacted in a weight ratio of 1/2:1 to 4:1, respectively.

13. The method of claim 12 wherein the 4-sulfophthalic acid and phthalic anhydride are reacted in a weight ratio of 1:1 to 2:1, respectively.

* * * * *